United States Patent [19]

Steggall

[11] 4,226,390

[45] Oct. 7, 1980

[54] MOUNTING DEVICE

[75] Inventor: Christopher L. Steggall, London, England

[73] Assignee: Medishield Corporation Limited, London, England

[21] Appl. No.: 957,106

[22] Filed: Nov. 2, 1978

[30] Foreign Application Priority Data

Nov. 7, 1978 [GB] United Kingdom ............... 46308/78

[51] Int. Cl.² ............................................ A47G 29/00
[52] U.S. Cl. ............................... 248/124; 248/225.3 R
[58] Field of Search ............... 248/121, 122, 124, 125, 248/225.3, 226.3, 226.4, 229

[56] References Cited

U.S. PATENT DOCUMENTS

| | | | |
|---|---|---|---|
| 2,469,904 | 5/1949 | Szuba | 248/124 |
| 3,212,748 | 10/1965 | Faurot | 248/124 X |
| 3,391,889 | 7/1968 | Stewart | 248/124 X |
| 3,405,984 | 10/1968 | Clark | 248/124 X |

Primary Examiner—James C. Mitchell
Attorney, Agent, or Firm—Dennison, Dennison, Meserole & Pollack

[57] ABSTRACT

A device for mounting an accessory on a generally vertical column. The column preferably forms part of a support for an anaesthetic or like machine. The mounting device comprises a ring clamp adapted to engage the column at a chosen location (which may be adjustable), a split bearing adapted to embrace the clamp so as to be capable of only pivotal movement about the clamp and column, and means for securing an accessory onto one element of the bearing.

6 Claims, 8 Drawing Figures

MOUNTING DEVICE

FIELD OF THE INVENTION

This invention relates to supports for anaesthetic or other machines having several component parts intended to be kept near to each other during storage and while in use. In particular the invention concerns a device for mounting an accessory on a generally vertical column which may form part of such a support.

BACKGROUND OF THE INVENTION

Anaesthetic machines normally include supports for cylinders of compressed anaesthetic, carrier or respirable gases; a table or other working surface; at least one flowmeter for individual or mixed gases; a support for vaporizer for converting liquid anaesthetics into respirable vapors, and a carbon dioxide absorber or like ancillary apparatus. Such machines are normally designed to support a specific number of component parts of each type. This makes it difficult to add any additional components to a machine at a later date.

The present invention aims at providing a support for interrelated components, the support including at least one generally vertical column to which the components can be mounted in a manner permitting them to be added and removed at will from the column whereby to support the components desired by the user, and not as dictated by the manufacturer.

The present invention also aims at providing simple means for attaching each component to the column at a specified height and in a manner permitting the component to be pivoted about the column axis.

SUMMARY OF THE INVENTION

According to one feature of the present invention there is provided a device for mounting an accessory on a column intended to be generally vertical in use, comprising a ring clamp adapted to engage the column at a chosen location (which may be adjustable); a split bearing adapted to embrace the clamp so as to be capable of only pivotal movement about the clamp and column and means for securing an accessory onto one element of the bearing.

According to a second feature of the present invention there is provided a support for an anaesthetic or like machine having several component parts intended to be kept near to each other during storage and while in use, comprising at least one column adapted to be supported generally vertically and being engaged by at least one mounting device as defined above.

By 'ring clamp' in this specification is meant any device which may embrace a smooth column with such a tight grip that the device may transfer to the column the weight of a member engaging the device in a pivotal fashion.

The or each column forming part of a support in accordance with the invention may be supported at its upper end from the ceiling of the operating theatre or other room in which it is to be used, or from a wall-mounted boom. In a preferred class of embodiments however, the column or columns are supported at their lower ends by a wheeled trolley, and it is in this preferred form that the invention will now be more particularly described, with reference to the accompanying drawings.

DESCRIPTION OF THE PREFERRED EMBODIMENTS

Figure 1:
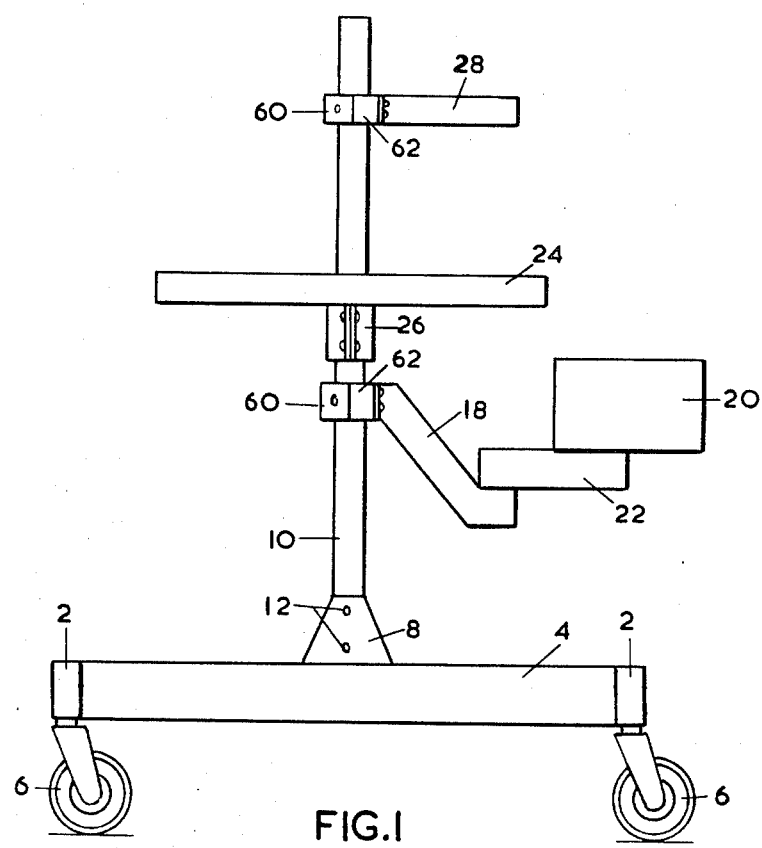
FIG. 1 is a diagrammatic front elevation of a single-column mobile support of the present invention.

The mobile support shown in FIG. 1 includes a base in the shape of an H, having two side members 2 connected together by a web 4. Secured in both ends of each side member 2 are castor wheels 6, of which the supports have been omitted from the drawings for clarity.

Bolted to the upper surface of web 4 is a frame bracket 8 intended to define a socket for the lower end of a vertical column 10. The column is held in the bracket 8 by means of two bolts 12.

Figure 4:
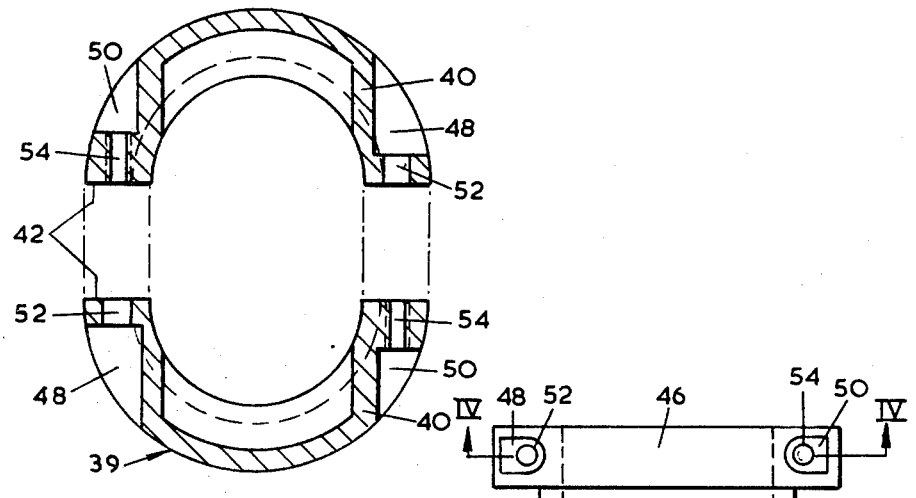
FIG. 4 is a sectional plan view of the two components of a ring clamp of the present invention.
Figure 5:
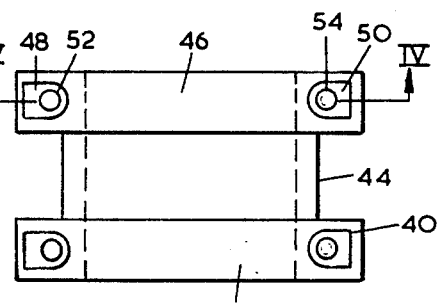
FIG. 5 is a side elevation of one of the clamp components shown in FIG. 4.

Clamped to column 10 at at least one location on the column is a ring clamp which is not shown in FIG. 1 but which is as shown in FIGS. 4 and 5. Engaging the clamp is a two-part bearing shown in more detail in FIGS. 6 to 8. Although the bearing will be described in greater detail with reference to these other figures it is shown in FIG. 1 as consisting of a cap 60 and a base 62, the two members being secured together by a pair of screws. The base member 62 presents a vertical planar mounting surface having in it tapped holes by means of which an accessory fitment can be mounted on the bearing. As shown in FIG. 1, a typical such fitment is a cranked arm 18 for a carbon dioxide absorber 20. As shown in the drawing, the absorber is conveniently connected to arm 18 by an extension 22 which is able to rotate about arm 18. The bearing is intended to embrace the ring clamp fairly tightly so as to provide a mechanical connection by which the weight of the fitment is able to be transferred to the ring clamp, and from there to the column 10 despite the eccentric loading necessarily imposed on the column by virtue of the spacing of the centre of gravity of the fitment from the column axis. Normally a liner of low-friction plastics material is interposed between the bearing and the ring clamp so as to permit the bearing, and the fitment connected thereto, to be pivoted about the axis of column 10 with little difficulty, although the engagement between the clamp and the liner, and between the liner and the bearing, is sufficient to hold the fitment securely in place as long as the column 10 is kept vertical.

Rigidly mounted on the column 10 is a table 24 welded or otherwise permanently secured to a sleeve clamp 26 which is in the form of a cylindrical sleeve with a longitudinal slit provided with a pair of opposed and parallel flanges adapted to be brought together by means of nuts and bolts so as to reduce the internal diameter of the sleeve to bring it into a tight frictional grip with column 10. Once the table 24 has been positioned at the desired height relative to the floor, the sleeve clamp 26 is tightened and would normally remain fixed in that position during the life of the support, although of course it could have its position adjusted if necessary.

Included for purposes of illustration is an accessory 28 secured to column 10 by a bearing similar to that already described. It will be appreciated that, because of the relative ease with which different fitments can be mounted on the bearings and because of the ease with which a bearing can be dismantled to provide access to the ring clamp so that it can be removed from the column, or have its position on the column altered, the support is very flexible in operation.

Although the support is described with reference to an anaesthetic machine, it will be appreciated that it can be used to support other machines having component parts which are intended to be kept close to each other, probably for the purpose of being connected together by means of conduits for electrical power and signals cooling water, various gases etc. It will thus be appreciated that the support is not limited to medical use (which term includes dentistry) but could be used for various electrical and/or mechanical machines.

Figure 2:
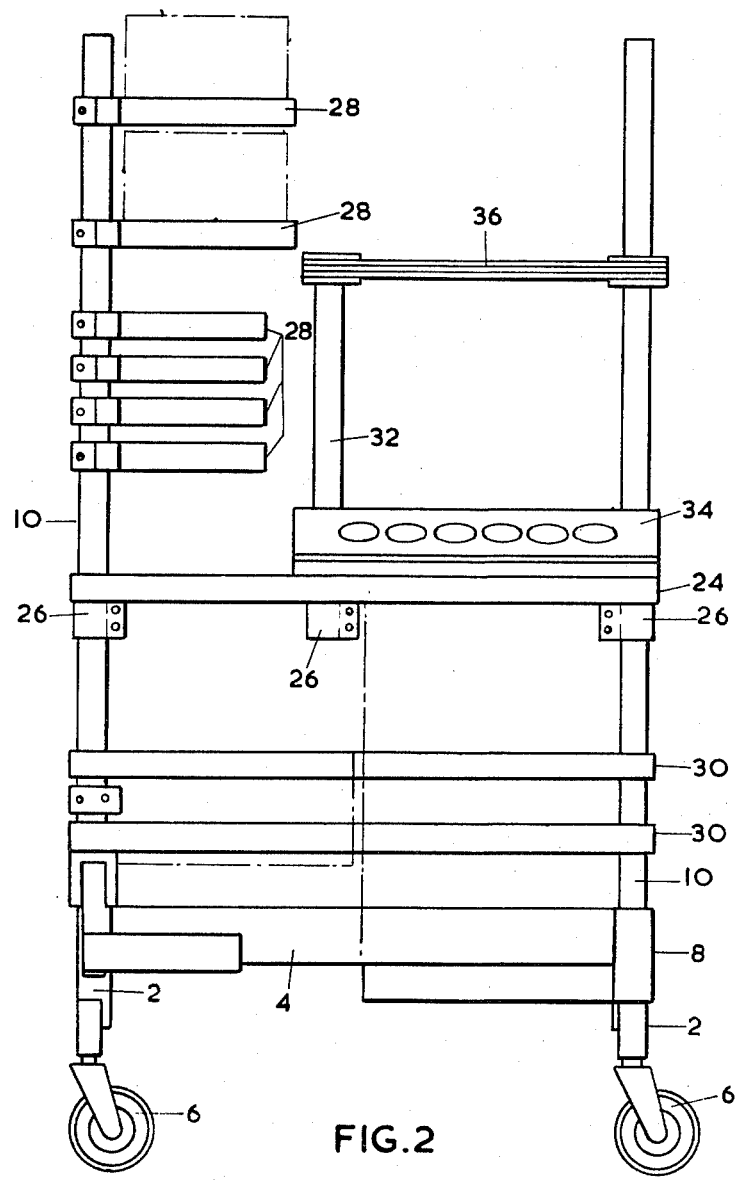
FIG. 2 is a front elevation of a double-column mobile support of the present invention.
Figure 3:
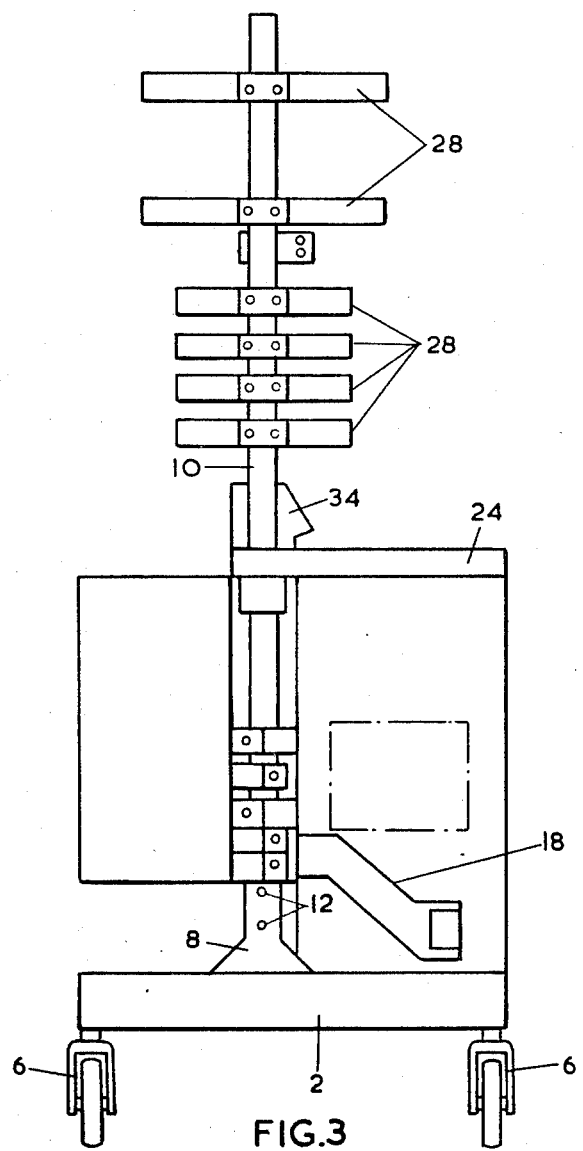
FIG. 3 is a side elevation of the support shown in FIG. 2.

It will be appreciated that the support shown in FIG. 1 is of the most simple form, consisting basically of a mobile support frame and a single column. A more complicated version of the support is shown in FIGS. 2 and 3, in which the parts similar to those shown in FIG. 1 have been given the same references.

The side members 2 of the support base itself differ from that form of the invention shown in FIG. 1 in that the frame brackets 8 are secured directly to the side members 2. The bolts used to secure the two columns 10 in position in the frame brackets are also used to secure the web 4 to the two brackets so as to provide a rigid support for the two columns 10.

As can be readily appreciated, the provision of a pair of support columns permits cross members 30 to be secured to them with the cross members in turn supporting associated pieces of equipment.

The provision of the two columns also enables a work surface 24 of far greater surface area than that shown in FIG. 1 to be used. The table 24 shown in FIGS. 2 and 3 is secured to each of the columns 10 by means of its own sleeve clamp 26. Also welded to the table 24 is a third sleeve clamp 26 adapted to hold the lower end of an auxiliary support column 32. Connected to the main column 10 and auxiliary column 32 is a housing 34 for several gauges, of which the faces are displayed on an inclined face of the housing 34. The upper end of column 32 is connected to one of the columns 10 by means of a tie member 36 which may function as a support for anaesthetic vaporizers or other items of equipment which are intended, in use, to be associated with the gauges displayed in housing 34. Each of these vaporizers may be aligned vertically with its respective gauge so as to indicate quickly to an operator of the equipment which anaesthetic is in use at any particular time, and the reading associated with its use.

Although this has not been shown in the drawing, the remainder of the support column 10 above the tie member 36 may also be used to carry accessories 28, in a manner similar to that shown for that portion of the other column which extends above table 24.

As already mentioned, one of the features of the present invention is the means by which an accessory can be mounted on a support column presenting a smooth cylindrical surface. In accordance with this feature of the invention, the first step in mounting an accessory on the column is to attach a ring clamp on the column at the desired height. In one form of ring clamp, such as is shown in FIGS. 4 and 5, the clamp 39 takes the form of two identical semi-cylindrical parts 40. Each presents a inner cylindrical surface extending through less than 180°, so that when the two parts are positioned on the column their opposing end faces 42 are separated slightly from each other. As can be seen more clearly from FIG. 5, each clamp part 40 consists basically of a plain part-cylindrical member 44 terminating in two part-cylindrical flanges 46. As can be seen in FIG. 4, the outer surfaces of the flanges 46 are provided with respective recesses 48 and 50 which are aligned with respective plain apertures 52 and tapped passages 54.

In order to secure the two clamp parts 40 together, a screw is inserted through each passage 52 and engages the aligned tapped passage 54 and screwed home until the two parts engage the column 10 firmly enough to resist all normal translational and rotational forces. When the screws (not shown) are fully home, their heads lie completely within the envelopes of recesses 48 so that the curved surfaces of flanges 46 define a virtually-complete cylinder.

Figure 6:
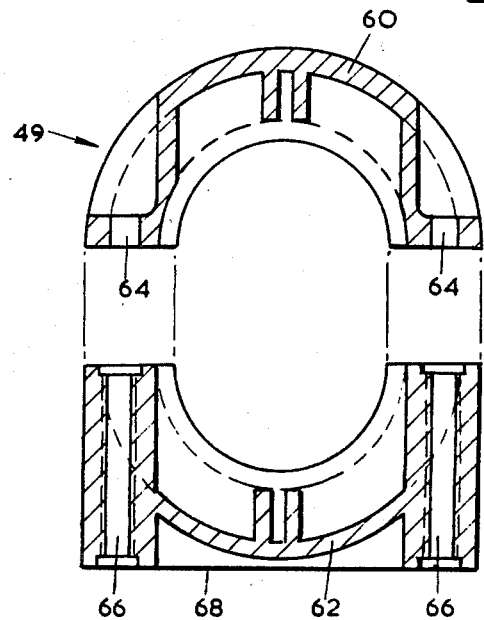
FIG. 6 is a sectional plan view of the two components of a bearing adapted to embrace the ring clamp shown in FIG. 4
Figure 7:
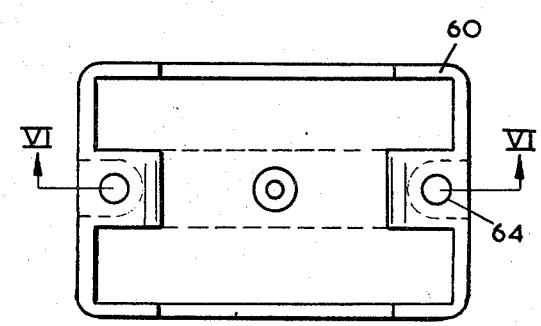
FIG. 7 is a side elevation of the bearing member shown in the upper part of FIG. 6.
Figure 8:
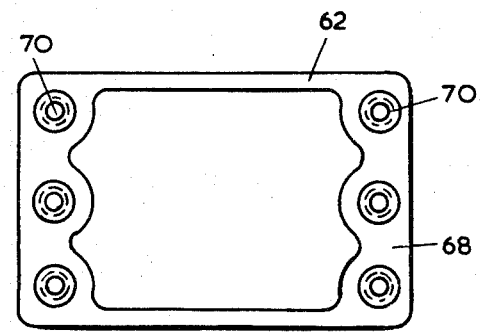
FIG. 8 is a side elevation showing the accessory-mounting surface of the bearing component shown in the lower part of FIG. 6.

The bearing shown in FIGS. 6 to 8, consists basically of a cap 60 and a base 62, which are intended to be secured to each other by means of a pair of screws passing through plain passages 64 in the cap and engaging tapped passages 66 in the base. When so positioned the bearing provides an internal space of complementary shape to the outer shape of ring clamp 39 shown in FIGS. 4 and 5. As already mentioned, the internal space of the bearing 49 is sufficient to accommodate a liner of self-lubricating plastics material intended to be interposed between the bearing 49 and the clamp 39. The engagement of the bearing with the flanges 46 of the clamp prevents the bearing from moving axially relative to the clamp or to the column. However, the bearing is free to rotate about the axis of the clamp and the column, and such rotation is assisted by the fit between the two members being of low friction. However, it will be appreciated that any plastics liner has to be of relatively tough material so as to resist deformation, thus preventing the bearing from canting so that its axis lies at an angle to the axis of the clamp 39.

The mounting face 68 of the bearing base 62 is provided with two triplets of tapped holes 70. Normally the centre hole of each triplet is not available for mounting screws for a fitting, because it contains the end of the screw by which the two bearing parts are secured together but in some instances a shorter clamping screw may be used leaving the other end of the hole free to receive a mounting screw. All the accessories which are intended to be mounted on the column so as to be capable of pivotal movement have of necessity to present a planar surface with passages aligned with the tapped passages 70 to receive mounting screws.

It will thus be seen that the present invention provides a support for interrelated components intended to be stored or used while positioned relatively closely to each other, with at least some of the components being able to be pivoted about the axis of a support column.

This pivotal movement permits some bulky accessories to be stored within the envelope of the base of the support when not in use, and to be pivoted to an outboard position when in use.

It will be appreciated that each bearing 49 can be used for supporting at any one time one of a large number of accessories. In addition, when a bearing is not at the right height on a column for the accessory intended to be used with it, the bearing can be dismantled with relatively little trouble, thus giving access to the clamp 39 which then may be either completely removed or only repositioned before the bearing is again assembled ready to have a fitment connected to it in its new position.

Although the ring clamp conveniently has the form shown in FIG. 4, it is within the purview of the present invention to use a clamp having two components hinged together and able to have their distal ends connected together by screws or other fastening devices. What is common to all such ring clamps, however, is that they provide a cylindrical outer surface with at least one protuberant flange presenting a cylindrical outer surface of larger diameter so that when a bearing of complementary inner shape is mounted on the clamp it is able to move only pivotally relatively to the clamp, and not axially.

I claim:

1. A device for rotatably mounting an arm on a substantially vertical column comprising a split ring encircling the column at a chosen location along its length and secured thereto; a split clamp embracing said split ring encircling said column and capable of rotative movement about the split ring and column; and means for securing a support on at least one element of said split clamp.

2. A device as claimed in claim 1, in which the split ring is in the form of two identical parts adapted to be held together by means of threaded fastening means.

3. A device as claimed in claim 2 in which each of said two identical parts includes a plain central cylindrical portion terminating in a flange portion, each part selectively provided with complementary tapped and plain passages for said fastening means and recessed sufficiently that said fastening means lie completely within an envelope defined by the outer surfaces of the flanges.

4. A device as claimed in claim 1 in which the split clamp includes a cap and a base adapted to be clamped together by means of fasteners to define between them a space shaped to complement the outer shape of the split ring.

5. A device as claimed in claim 4 in which the split clamp defines a planar mounting face including at least one opening for receiving fastening means by which an arm may be secured to the mounting face.

6. A device as claimed in claim 1 in which there are two or more columns in parallel with each other.

* * * * *